(12) United States Patent
Maurer

(10) Patent No.: US 6,357,721 B1
(45) Date of Patent: Mar. 19, 2002

(54) VALVE ARRANGEMENT

(75) Inventor: Rainer Maurer, Stuttgart (DE)

(73) Assignee: Emerson Electric GmbH & Co., Waiblingen (DE)

( * ) Notice: Subject to any disclaimer, the term of this patent is extended or adjusted under 35 U.S.C. 154(b) by 0 days.

(21) Appl. No.: 09/414,982

(22) Filed: Oct. 7, 1999

(30) Foreign Application Priority Data

Oct. 7, 1998 (DE) .......................................... 198 46 226

(51) Int. Cl.[7] .............................................. F16K 31/02
(52) U.S. Cl. .................. 251/129.15; 251/148; 251/205; 251/326; 251/360
(58) Field of Search ................................ 251/326, 296, 251/129.15, 148, 205, 360, 362

(56) References Cited

U.S. PATENT DOCUMENTS

| | | | |
|---|---|---|---|
| 3,098,635 A | 7/1963 | Delaporte et al. | 251/54 |
| 3,417,784 A | * 12/1968 | Cowan | 251/326 |
| 4,614,327 A | 9/1986 | Valbjornbe et al. | 251/129.16 |
| 5,020,774 A | * 6/1991 | Christianson | 251/326 |
| 5,238,398 A | * 8/1993 | Harris | 251/326 |
| 5,246,199 A | 9/1993 | Numoto et al. | 251/129.15 |

FOREIGN PATENT DOCUMENTS

| DE | 1235091 | 2/1967 | |
|---|---|---|---|
| DE | 19710636 C1 | 6/1998 | F15B/13/044 |

* cited by examiner

Primary Examiner—Kevin Shaver
Assistant Examiner—David A. Bonderer
(74) Attorney, Agent, or Firm—Skjerven Morrill MacPherson LLP; David E. Steuber

(57) ABSTRACT

Valve arrangement, in particular as pulse width modulated expansion valve of a refrigeration system, comprising the following elements: a valve body (1) with a passage opening (5), an armature tube (2) which is inserted into one end of the passage opening (5), an armature (3) which can be moved back and forth in the armature tube (2), a stationary armature core (4) which is inserted into the outwardly lying end of the armature tube (2), a restoring element (22) which is active between the movable armature (3) and the stationary armature core (4), a closure element (18) which is carried by the movable armature (3) and which cooperates with a passage opening (17) for opening and closing the valve arrangement as well as comprising a magnetic coil for actuating the valve arrangement, with a ring space (19) being formed between the armature tube (2) and the movable armature (3), the opening cross-section of which is dimensioned in such a manner that the space (20) which is formed between the movable armature (3) and the stationary armature core (4) acts as a damping chamber, through which the opening and closing movement of the movable armature (3) is damped. The forming of the pass-fit damping directly between the armature tube (2) and the movable armature (3) is advantageous in the technical manufacturing.

10 Claims, 4 Drawing Sheets

Figure 1:
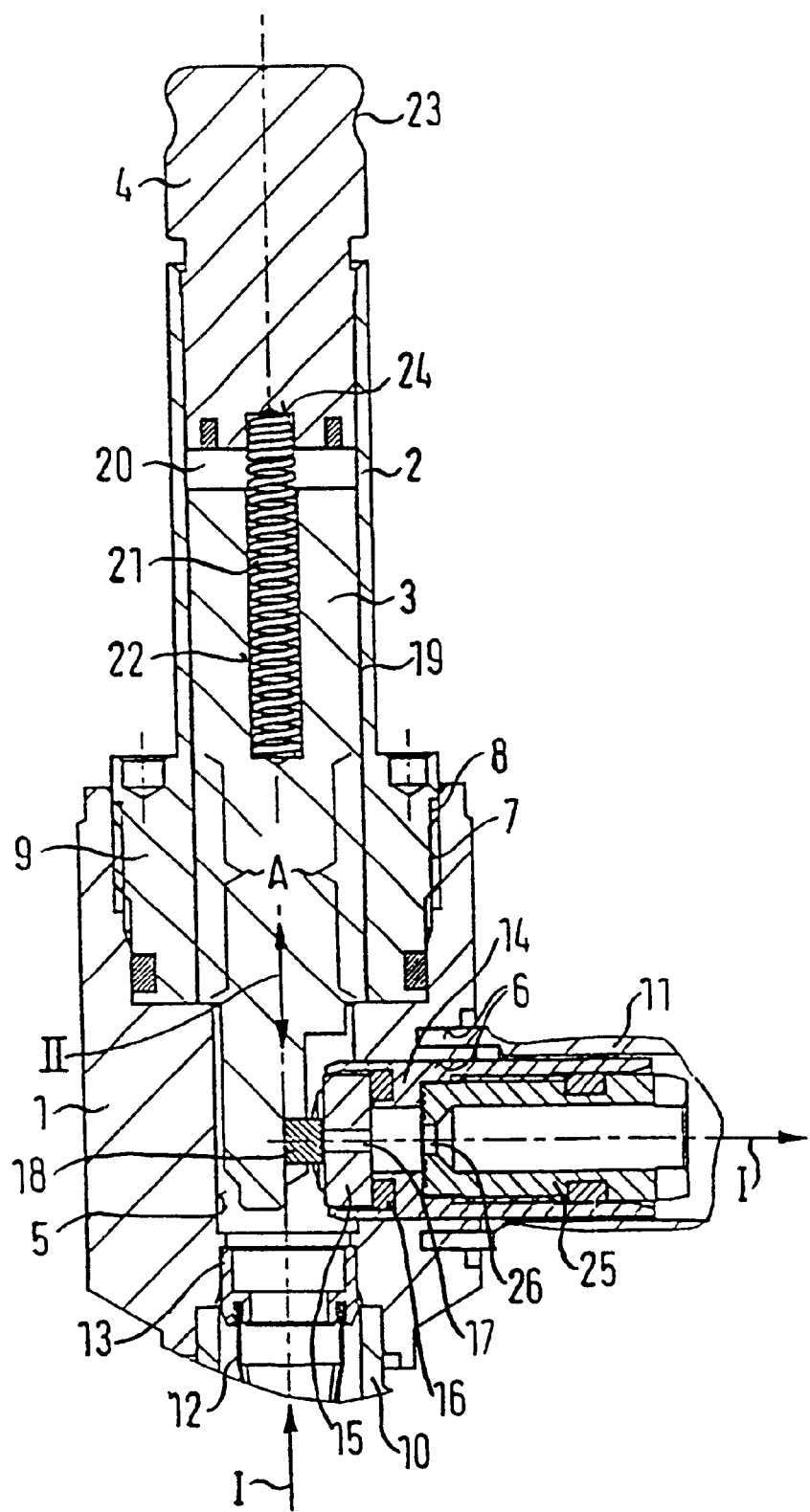

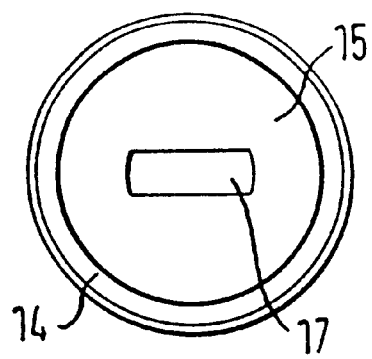
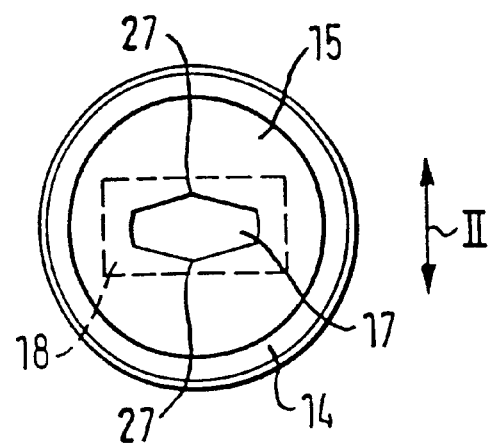
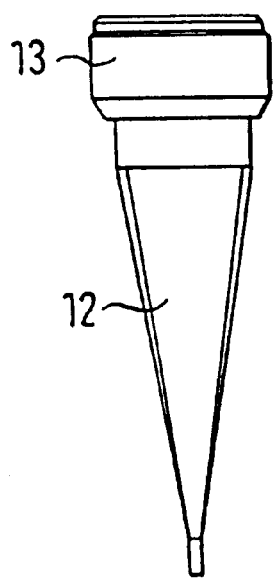

VALVE ARRANGEMENT

The present invention relates to a valve arrangement, in particular for an expansion valve of a refrigeration system, the capacity of which is determined by pulse width modulation. This means that within a cycle of for example 6 seconds the valve is opened, in particular electromagnetically, for a specific fraction, for example 4 seconds, and closed for the remaining fraction, that is, in this example 2 seconds. The ratio of the opening time to the closing time determines the degree of opening of the valve and thus the mass flow through the valve.

Valves of this kind are already known and are used in refrigeration circuits instead of the usual thermostatic expansion valves. In this these valves can serve not only as an expansion valve, but also as a closure valve. A separate closure valve is thus not required.

A problem in valves of this kind as a result of the frequent change between the open position and closure position is the so-called water hammer effect, that is, the shock waves resulting from the rapid opening and/or closing. It is therefore already known to provide a damping device. For this the space between the movable valve armature and the stationary armature core is formed as a damping chamber in that the space between the movable valve armature and the armature tube surrounding the latter is formed as a throttling passage. In this a brass sleeve which is finished to a pass fit is inserted into the armature tube, which is usually manufactured of steel, and surrounds the movable armature at such a distance that the medium can escape from the damping chamber only at a desired speed.

In accordance with the invention it is now provided, instead of a sleeve, to form the armature tube itself as a pass fit tube, in particular in that a precisely machined bore is introduced into the armature tube. In this the armature tube is manufactured of a suitable material, for example brass. The armature core of magnetic iron is then inserted into the armature tube and secured to the latter for example through hard soldering. This execution is advantageous in regard to the manufacturing technique, since a turned brass part can be used, whereas in the use of a sleeve for the pass fit damping a comparatively thin tube must be used. In addition this tube must be inserted into the conventional armature tube, for which the conventional armature tube must be manufactured with sufficient measurement precision and an additional step is required in the manufacture.

Furthermore, it is also advantageous when the armature tube and preferably also the movable armature are finished to a pass fit only over a region of their surfaces. Through this a sufficient pass fit for achieving the desired damping can be attained with a low cost and complexity.

Furthermore, it is advantageous when securing means are formed on at the armature tube, through which the armature tube can be connected to the valve housing. In particular the armature tube can be provided with an outer thread. A separate component is thereby saved. In all there results thereby a reduction of the required components from four to two, namely instead of an armature tube, a securing means such as a hexagonal nut, an armature core and a pass fit sleeve now only an armature tube with an outer thread and an armature core are required. In this the armature core can be designed such that it can be used in addition for securing the magnetic coil to the armature; for example a circumferential groove can be provided in its periphery into which a securing means, for example a bracket, engages.

The valve in accordance with the invention is preferably executed as a slider valve. This has the advantage that friction which arises on the seating surface with the valve opening during the displacing of the slider element additionally damps the movement of the valve. In addition the slider is pressed onto the counter-surface by the refrigerant medium, which is under pressure, when the valve is used as an expansion valve in a refrigeration circuit. Through this on the one hand the frictional force is increased and on the other hand a reliable complete closing is ensured. A further advantage with respect to an axially seated valve consists in that the armature is not sucked onto the valve seat as a result of the pressure conditions which are present when the valve is closed. The water hammer effect is further reduced thereby.

Synthetic material, including ceramic, is preferably used for the slider and/or for the counter-surface. In particular silicon carbide and aluminum oxide have each proved advantageous, with it being possible either for both elements to be manufactured of the same material or one each of them of one of the two materials. With these materials very even planar surfaces can be produced. In addition, in contrast to metal, there is no danger of corrosion. The use of silicon carbide and/or aluminum oxide in contrast to the use of Teflon has the advantage that through the named materials no metal particles which are possibly present can be accumulated. Through the named materials therefore an improved inner imperviousness of the valve can be achieved. This is important in particular in regard to the closing function in order to achieve energy losses which are as low as possible.

In the valve in accordance with the invention it is preferably observed that the ring gap between the armature tube and the movable armature is not chosen too small in order to avoid a gas resiliency effect. Such a strong damping could lead to an alternating current vibration of the valve.

A restoring spring is preferably provided for restoring a movable armature. The former is in particular provided between the movable armature and the armature core and, likewise preferably, accommodated at both ends in blind holes. This arrangement and embodiment simplifies the assembly. Through the use of a spring of small cross-section and without a great buckling stability a rotatability of the movable armature can be achieved in addition. The wear of the movable armature is thereby advantageously reduced. Accordingly, it is preferred to support the slider at the movable armature in such a manner that the movable armature is rotatable, in particular largely freely rotatable. For this the movable armature can be provided with a reception groove at its periphery in which the slider, which is reciprocally formed thereto at its facing side, is supported. The lifetime of the movable armature can be thereby increased.

A further improvement results in that the passage opening in the counter-surface to the slider is formed in the direction of movement of the slider in such a manner that the opening is only slowly freed at first and then increasingly rapidly. In particular the opening cross-section can be designed to run together in a pointed manner in the direction of movement of the slider, that is, in such a wedge-like manner that at first only a wedge tip is freed by the slider. Through this an abrupt change between a completely closed and an opened passage opening is avoided. Through this the water hammer effect is also further reduced.

A further improvement results in that a further opening with selectable cross-section is provided in addition to the passage opening in the counter-surface. The capacity of the valve can thereby be varied via the choice of this second opening, which can be provided in a special insert. This is particularly economical, in particular also in stocking, since all remaining constituents of the valve are the same for different capacities.

It is particularly preferred when the additional passage opening is formed as a replaceable exchange nozzle, which can in particular be screwed together with the valve housing. With this the capacity of the valve can be changed in a simple manner through replacement of the exchange nozzle. If the exchange nozzle is arranged behind the passage opening of the counter-surface a replacement directly via the connector piece is possible, so that the replacement can be carried out without opening the valve. It is merely necessary to unscrew the exchange nozzle out of the valve housing from the outlet side and to screw in another, desired nozzle.

Figure 5:
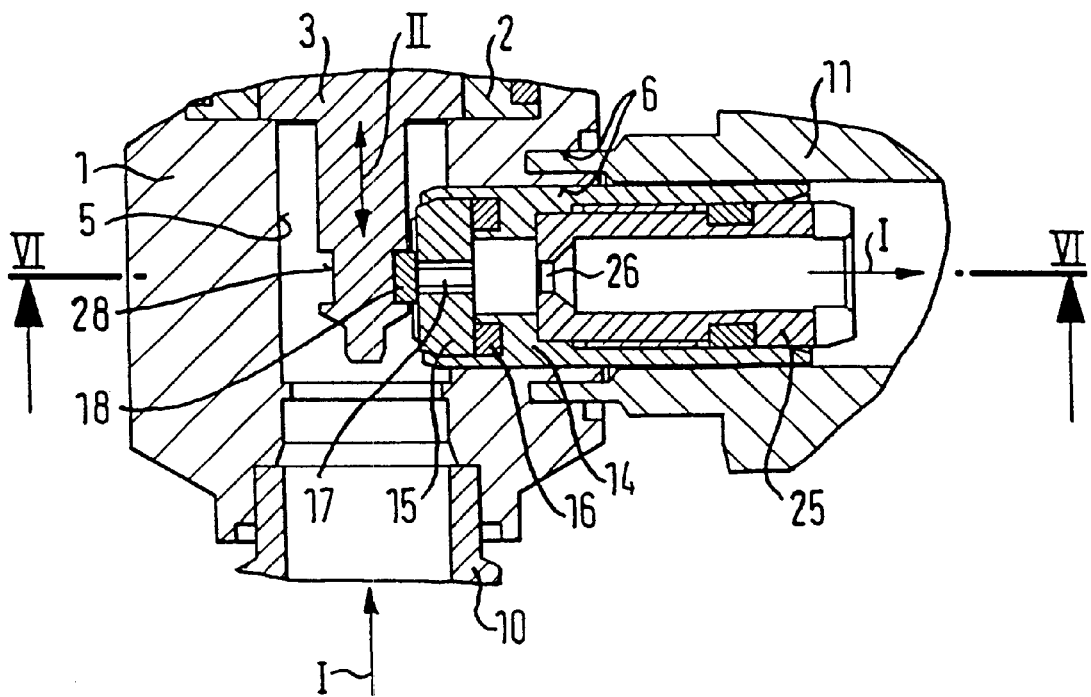
Figure 6:
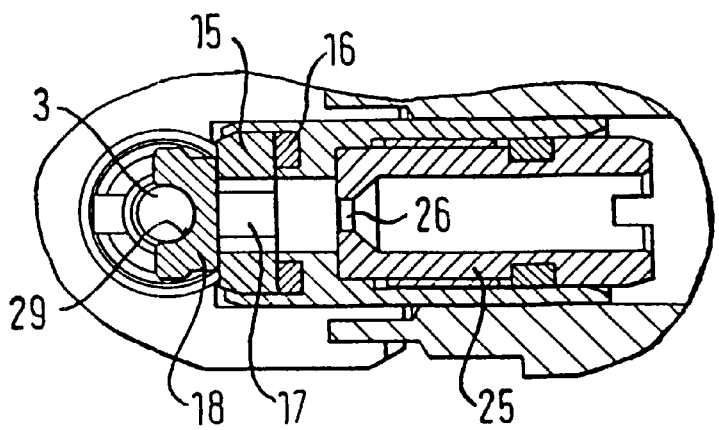
Figure 7:
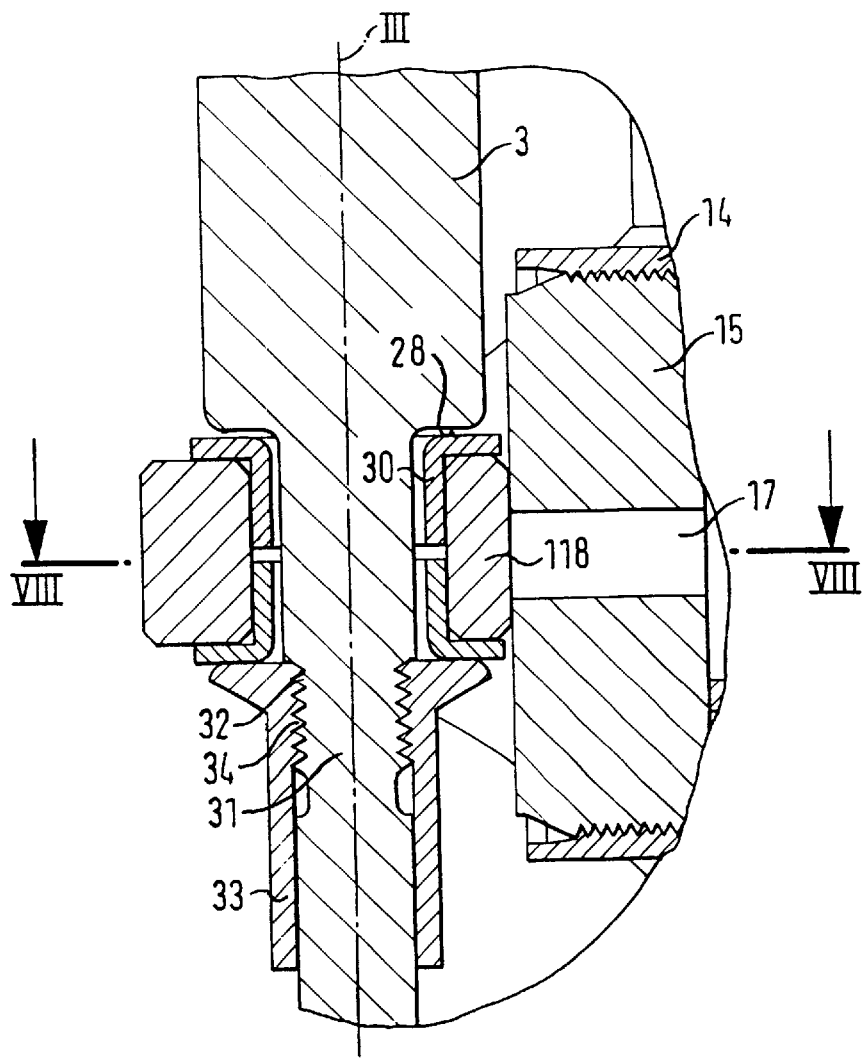

Exemplary embodiments of the invention are illustrated in the drawings and will be described in the following. Shown, in each case in schematic illustration, are:

FIG. 1 a section through a valve arrangement in accordance with the invention,

FIG. 2 a plan view of a detail of FIG. 1,

FIG. 3 a variant of FIG. 2,

FIG. 4 a plan view of a further detail of FIG. 1,

FIG. 5 a part of a variant of FIG. 1,

FIG. 6 a section in accordance with the line VI—VI in FIG. 5,

FIG. 7 a part of a further variant of FIG. 1 and

Figure 8:
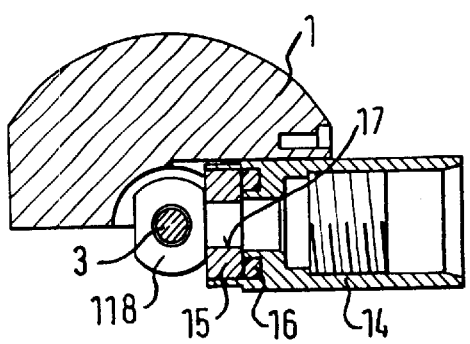

FIG. 8 a section in accordance with the line VIII—VIII in FIG. 7.

The valve arrangement illustrated in FIG. 1 comprises a valve body 1, an armature tube 2, an armature 3 which can be moved back and forth in the armature tube and a stationary armature core 4 which is inserted into one end of the armature tube 2. The valve body 1 has a passage opening 5 and a lateral opening 6 which opens into the latter. The passage opening 5 is stepwise widened and provided with an inner thread 7 at one end of the valve body 1. A widened section 9 which is provided with an outer thread 8 and which is formed on at the armature tube 2 is screwed in into the inner thread 7.

The other end of the passage opening 5 is likewise widened stepwise. At this end a connector piece 10 for connecting up a fluid line is inserted into the passage opening 5. The connector piece 10 can be a simple tube piece, in particular of copper, which can be soldered to a duct. It can also however be a connector piece with a thread, onto which a tube can be screwed.

A connector piece 11 for connecting up a duct is likewise inserted into the lateral opening 6. Here as well the connector piece 10 can be a simple tube piece, in particular of copper, or a connector piece which is provided with a thread.

In the region of the connector piece 10, which in particular defines the entry of the valve arrangement, a sieve 12 with a supporting ring 13 is furthermore inserted into the passage opening 5. The sieve 12, which is illustrated in detail in FIG. 4, is formed in the shape of a cone and points with its cone apex counter to the flow direction I. Through this a pegging of the sieve 12 is made more difficult.

A tubular adapter 14 is inserted into the connector piece 11 and protrudes with its front end into the passage opening 5 of the valve body 1. A disc 15 is inserted into this front end of the adapter 14 and sealed off via an O-ring 16. The disc 15 has a slit shaped passage opening 17 for the medium to be controlled.

The side of the disc 15 pointing towards the passage opening 5 is formed as a sliding surface for a slider element 18 which is carried by the lower end of the movable armature 3. The slider element 18 is moved back and forth with the movable armature 3 in the direction of the arrow II and thus cooperates with the disc 15 as a slider valve.

Not illustrated is the magnetic coil arrangement for actuating the valve arrangement in accordance with the invention.

Silicon carbide can advantageously be used as the material for the slider element 18, aluminum oxide for the disc 15. The materials can however also be used in reverse or in each case for both elements 15, 18. In principle however other materials can also be used for the elements 15, 18.

The movable armature 3 and the armature tube 2 which surrounds the latter are formed in their cross-sections in such a manner that between the movable armature 3 and the armature tube 2 a ring space 19 is formed which enables a flowing through of medium to or from the space 20 which is formed between the movable armature 3 and the stationary armature core 4. In this, the movable armature 3 and the armature tube 2 are formed in their cross-section in a section A in such a manner that when the movable armature 3 moves back and forth in accordance with the arrow II, medium can flow out of or into the space 20 respectively only with a specific speed or flow-through amount respectively. The space 20 thereby acts as a damping chamber, which damps the movement of the movable armature 3 during the opening and closing of the valve arrangement. In this the peripheral sections of the armature tube 2 and of the movable armature 3 facing each other are preferably surface treated accordingly in the region A in order to reliably ensure the desired pass fit damping.

The restoring of the movable armature 3 is ensured by a spring 21 which is accommodated in a blind hole 22 of the movable armature 3 and an oppositely situated blind hole 24 in the stationary armature core 4 in such a manner that the movable armature 3 can lie completely in contact at the stationary armature core 4. The spring 21 is formed as a long and thin spring with a low buckling resistance in order to permit a rotation of the movable armature 3 about its movement axis II.

In addition an exchange nozzle 25 is screwed in into the adapter 14. At its side which faces the passage opening 5 the exchange nozzle 25 is provided with a passage opening 26 which determines the through-flow cross-section of the valve arrangement. Through replacement of the exchange nozzle 25 the capacity of the valve arrangement can thus be varied in a simple way. As can be seen, the exchange nozzle 25 is directly accessible from the outlet side of the valve arrangement and can thereby be replaced without opening the valve arrangement.

FIG. 2 shows a possible embodiment of the disc 15 with a passage opening 17. The passage opening 17 is substantially rectangular here. In the variant illustrated in FIG. 3 the passage opening 17 is on the contrary substantially hexagonal with two corners 27 which point in the direction of movement II of the movable armature 3. As can be recognized, it is thereby achieved that the slider element 18 which is indicated in broken lines in FIG. 3 closes the passage opening 17 more slowly than in the variant which is illustrated in FIG. 2, in particular not abruptly. Rather, at first a small, triangular opening cross-section still remains free at the end of the closure process and becomes smaller with decreasing speed until the opening 17 is then completely closed. In principle it is also possible to provide the opening 17 with a corner 27 at one side only. In any case the water hammer effect during the closing of the valve arrangement is thereby reduced.

In the variant of the valve arrangement in accordance with the invention illustrated in FIGS. 5 and 6 the movable armature 3 has at its lower end a ring groove 28, into which the slider element 18 is inserted. For this the slider element 18 is provided at its side which faces the movable armature 3 with a reciprocally formed, semicircular groove 29. This embodiment enables a rotation of the movable armature 3 about its movement axis II by an angle which can in principle have any desired value. The wear of the movable armature 3 and of the armature tube 2 is thereby reduced.

In the variant illustrated in FIGS. 7 and 8 the slider element 118 which is inserted into the ring groove 28 of the movable armature 3 is formed in the shape of a ring. In this the side of the slider element 118 facing the disc 15 with the passage opening 17 is flattened in order to form a suitable sealing surface. For manufacturing reasons the oppositely situated side of the slider element 118 is also flattened, as one recognizes in particular in FIG. 8.

The slider element 118 is inserted into the ring groove 28 of the movable armature 3, with a two-part carrier 30 which is U-shaped in cross-section being placed in between. The two parts of the carrier 30, which is preferably manufactured of polytetrafluorethylene (Teflon), are inserted from both sides into the central opening of the ring-shaped slider element 118 in the manufacture. In order to bring the carrier 30 with the slider element 118 onto the movable armature 3, the latter is formed at its lower end to be of two pieces, as can be recognized in FIG. 7, with a contracted section 31 with an outer thread 32 and a screw cap 33 with an inner thread 34. Via the contracted section 31 the carrier 30 with the slider element 118 can be pushed on onto the movable armature 3 and then fixed by the screw cap 33 in its working position. A simple assembly is thereby possible.

The design of the slider element in the manner described has the advantage that the movable armature 3 is nearly completely freely rotatable about its longitudinal axis III. Torques which possibly act on the movable armature 3 therefore have no influence on the slider element 118, so that its sealing function and easy displaceability relative to the disc 15 and the passage opening 17 are not impaired.

Through the invention there results as a whole a valve arrangement which on the one hand can be economically manufactured and which on the other hand has excellent properties, including a long lifetime. Both the inner and the outer imperviousness are very good. In addition the capacity of the valve arrangement can be rapidly and simply varied through replacement of the exchange nozzle 25 without it being necessary to open the valve arrangement.

LIST OF REFERENCE SYMBOLS 1 valve body
2 armature tube
3 movable armature
4 stationary armature core
5 passage opening
6 lateral opening
7 inner thread
8 outer thread
9 widening of 2
10 first connector piece
11 second connector piece
12 sieve
13 supporting ring
14 adapter
15 disc
16 O-ring
17 passage opening
18 slider element
19 ring space
20 damping chamber
21 spring
22 blind hole
23 groove
24 blind hole
25 exchange nozzle
26 passage opening
27 corner
28 ring groove
29 cut-out
30 carrier
31 section of 3
32 outer thread
33 screw cap
34 inner thread
118 slider element
I flow direction
II direction of movement of 3
III longitudinal axis of 3

What is claimed is:

1. Valve arrangement, in particular a pulse width modulated expansion valve of a refrigeration system, comprising:
    a valve body with a flow passage extending between inlet and outlet openings;
    a valve seat which is arranged in the flow passage and has a first passage opening for a medium to be controlled;
    a movable closing element which is arranged in the valve body and cooperates with the valve seat for opening and closing the valve arrangement; and
    a second additional, constantly completely open passage opening arranged in the flow passage which is provided as an insert and is formed as a replaceable exchange nozzle, the cross section of which determines the capacity of the valve arrangement.

2. Valve arrangement in accordance with claim 1, wherein the exchange nozzle is formed so as to be screwable together with the valve body.

3. Valve arrangement in accordance with claim 1, wherein the exchange nozzle seen from the inlet opening to the outlet opening is arranged after the valve seat.

4. Valve arrangement in accordance with claim 2, wherein the exchange nozzle, seen from the inlet opening to the outlet opening, is arranged after the valve seat.

5. Valve arrangement in accordance with claim 1, wherein the valve is designed as a slider valve.

6. Valve arrangement in accordance with claim 5, wherein the slider comprises a material selected from a group consisting of silicon carbide and aluminum oxide, and the counter-surface comprises a material selected from a group consisting of silicon carbide and aluminum oxide.

7. Valve arrangement, in particular a pulse width modulated expansion valve of a refrigeration system wherein the valve is designed as a slider valve, comprising:
    a valve body with a flow passage extending between inlet and outlet openings;
    a movable armature which is arranged in the valve body and is rotatable about its longitudinal axis;
    a valve seat which is arranged in the flow passage and has a first passage opening for the medium to be controlled;
    a movable closing element which is arranged in the valve body and cooperates with the valve seat for opening and closing the valve arrangement; and
    a second additional, constantly completely open passage opening arranged in the flow passage which is provided as an insert and is formed as a replaceable exchange nozzle, the cross section of which determines the capacity of the valve arrangement.

8. Valve arrangement in accordance with claim 7, wherein the movable closing element is designed in the shape of a ring and is journalled in a ring-shaped groove of the movable armature, in particular with a carrier of a sliding bearing material being placed in between.

9. Valve arrangement, in particular a pulse width modulated expansion valve of a refrigeration system, comprising:

a valve body with a flow passage extending between inlet and outlet openings;

a movable armature which is arranged in the valve body, wherein for restoring the movable armature a restoring spring is provided which is accommodated in particular at both ends in blind holes;

a valve seat which is arranged in the flow passage and has a first passage opening for the medium to be controlled;

a movable closing element which is arranged in the valve body and cooperates with the valve seat for opening and closing the valve arrangement; and a second additional, constantly completely open passage opening arranged in the flow passage which is provided as an insert and is formed as a replaceable exchange nozzle, the cross section of which determines the capacity of the valve arrangement.

10. Valve arrangement in accordance with claim 9, wherein the restoring spring has a low buckling stability and preferably a small diameter.

* * * * *